United States Patent
Dziak et al.

(10) Patent No.: US 9,025,265 B1
(45) Date of Patent: May 5, 2015

(54) METHOD OF FORMAT SAVINGS VIA PREDICTIVE CORRECTION OF SYNCHRONIZATION WORD

(71) Applicant: LSI Corporation, San Jose, CA (US)

(72) Inventors: Scott M. Dziak, Fort Collins, CO (US); Richard Rauschmayer, Longmont, CO (US); Jason D. Byrne, Lyons, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/230,532

(22) Filed: Mar. 31, 2014

Related U.S. Application Data

(60) Provisional application No. 61/946,258, filed on Feb. 28, 2014.

(51) Int. Cl.
*G11B 27/36* (2006.01)
*G11B 20/10* (2006.01)

(52) U.S. Cl.
CPC .......... *G11B 27/36* (2013.01); *G11B 20/10009* (2013.01)

(58) Field of Classification Search
None
See application file for complete search history.

(56) References Cited

U.S. PATENT DOCUMENTS

| | | | | |
|---|---|---|---|---|
| 5,231,545 A | * | 7/1993 | Gold | 360/49 |
| 5,966,258 A | * | 10/1999 | Bliss | 360/46 |
| 6,023,386 A | * | 2/2000 | Reed et al. | 360/51 |
| 6,603,622 B1 | * | 8/2003 | Christiansen et al. | 360/66 |
| 7,212,364 B1 | * | 5/2007 | Lee | 360/51 |
| 7,830,630 B2 | | 11/2010 | Ozdemir | |
| 7,859,782 B1 | * | 12/2010 | Lee | 360/51 |
| 8,049,983 B1 | | 11/2011 | Han et al. | |
| 8,279,546 B1 | * | 10/2012 | Han et al. | 360/51 |
| 8,300,342 B2 | * | 10/2012 | Galbraith et al. | 360/51 |
| 8,379,340 B2 | | 2/2013 | Ozdemir | |
| 8,379,498 B2 | * | 2/2013 | Mathew et al. | 369/47.28 |
| 8,395,858 B1 | | 3/2013 | Han et al. | |
| 8,405,924 B2 | * | 3/2013 | Annampedu | 360/51 |
| 8,599,973 B2 | * | 12/2013 | Galbraith et al. | 375/343 |
| 8,749,908 B2 | * | 6/2014 | Xia et al. | 360/51 |

* cited by examiner

*Primary Examiner* — Tan X Dinh
(74) *Attorney, Agent, or Firm* — Suiter Swantz pc llo

(57) ABSTRACT

A method and system for providing format savings in data sectors. The method includes receiving a signal outputted from an analog-to-digital conversion circuit. The method further includes shifting a signal phase of the signal based at least upon a corrected phase at an output of a phase loop and a phase measured when the signal was digitally sampled by the analog-to-digital conversion circuit. The method also includes adjusting a gain of the signal based at least upon a current gain loop correction and a gain correction made when the signal was digitally sampled by the analog-to-digital conversion circuit. Additionally, the method includes adjusting the signal based at least upon an output of a current offset correction and an offset correction made when the signal was digitally sampled by the analog-to-digital conversion circuit. The method also includes outputting an adjusted signal to a sync mark detector.

20 Claims, 9 Drawing Sheets

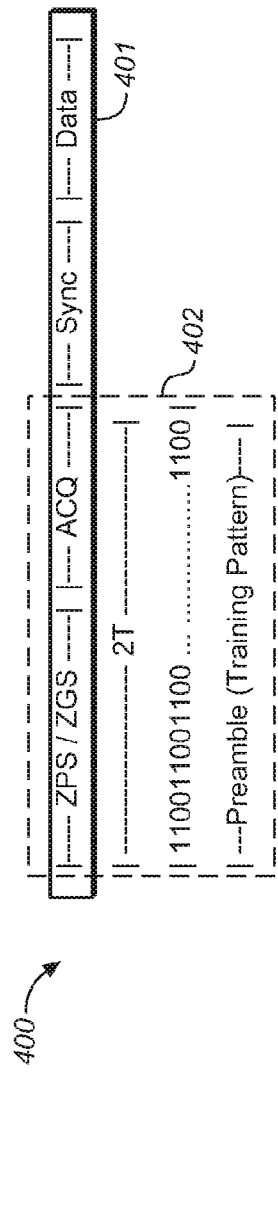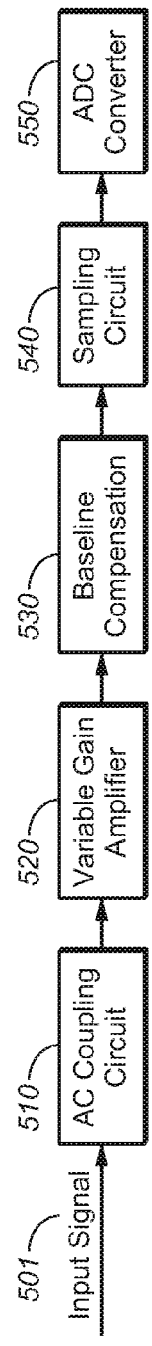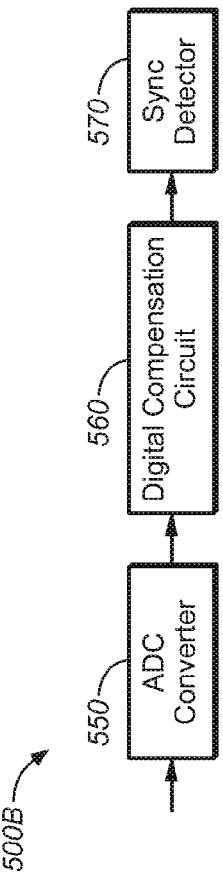

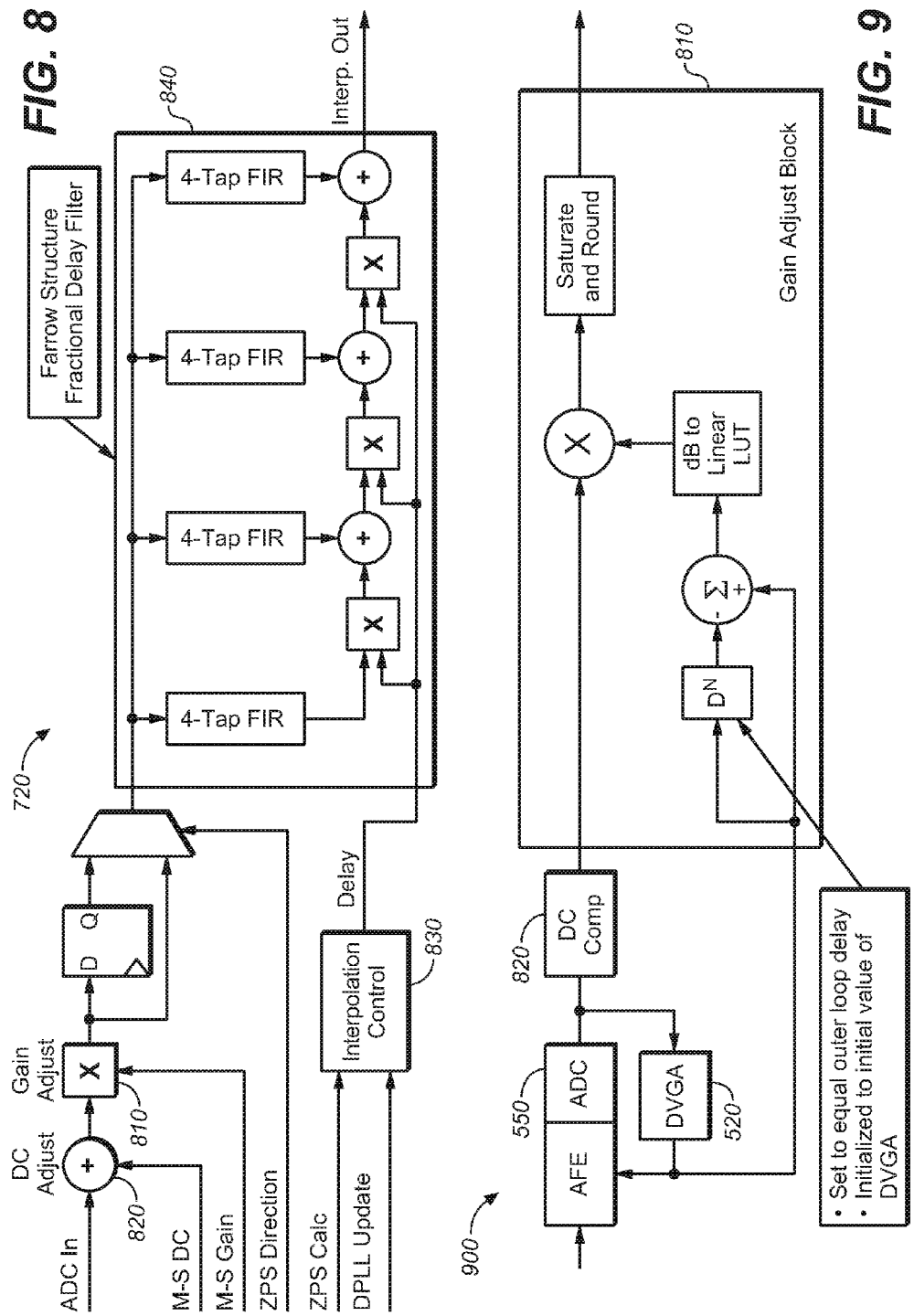

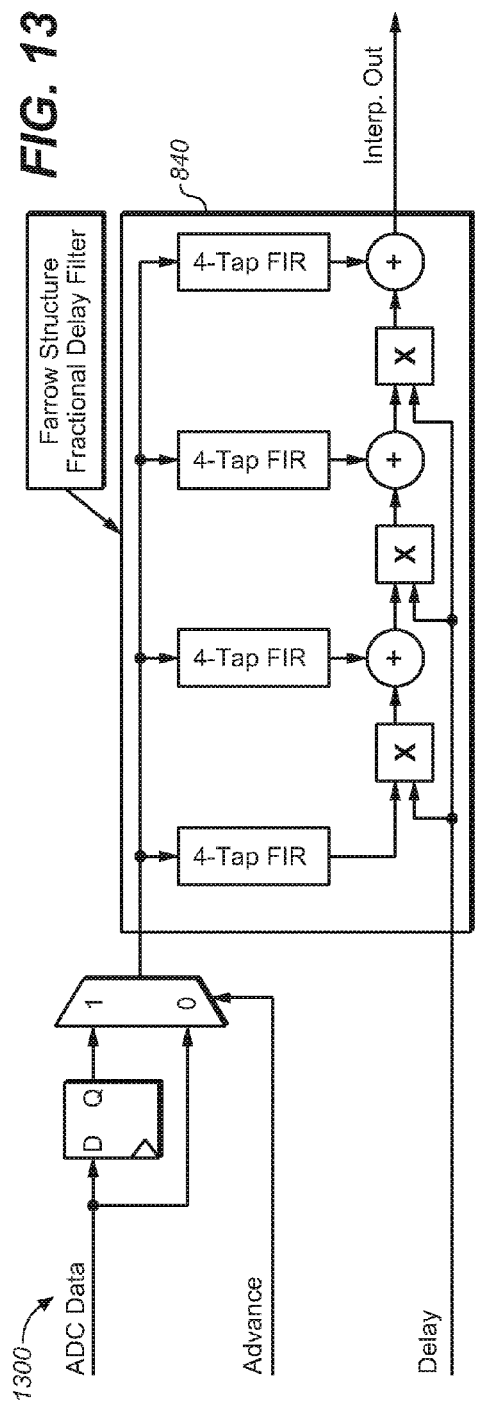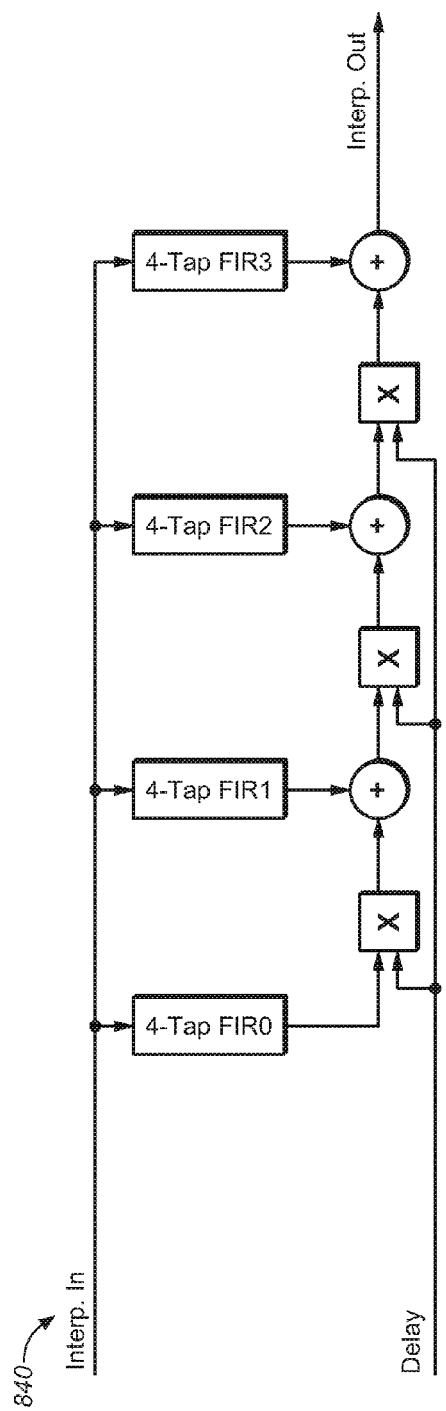

METHOD OF FORMAT SAVINGS VIA PREDICTIVE CORRECTION OF SYNCHRONIZATION WORD

CROSS-REFERENCE TO RELATED APPLICATIONS

This application claims the benefit of U.S. Provisional Application No. 61/946,258, filed on Feb. 28, 2014.

FIELD OF THE INVENTION

Embodiments of the invention are directed generally toward a method, circuit, apparatus, and system for providing format savings in data sectors.

BACKGROUND

In current read channels, sync mark detection does not start (that is, the first sample of the sync mark cannot be sampled) until phase correction calculated during zero phase start has applied all changes and those phase changes have fully settled at an analog/digital sampler. Therefore, it would be desirable to provide a method and system configured to reduce the amount of time required to begin sync mark detection.

SUMMARY

Accordingly, an embodiment includes a method for providing format savings in data sectors. The method includes receiving a signal outputted from an analog-to-digital conversion circuit. The method further includes shifting a signal phase of the signal based at least upon a corrected phase at an output of a phase loop and a phase measured when the signal was digitally sampled by the analog-to-digital conversion circuit. The method also includes adjusting a gain of the signal based at least upon a current gain loop correction and a gain correction made when the signal was digitally sampled by the analog-to-digital conversion circuit. Additionally, the method includes adjusting the signal based at least upon an output of a current offset correction and an offset correction made when the signal was digitally sampled by the analog-to-digital conversion circuit. The method also includes outputting an adjusted signal to a sync mark detector.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which:

FIG. 4 shows an interval diagram of a data sector;

FIGS. 5A-5B shows flow diagrams of exemplary circuit blocks of an exemplary read channel of an exemplary embodiment;

FIG. 8 shows a block diagram of the sync mark interpolator of an exemplary embodiment;

FIG. 9 shows a block diagram of a circuit;

FIG. 13 shows an exemplary overall block diagram of the fractional delay filter of an exemplary embodiment;

FIG. 14 shows an exemplary block diagram illustrating the configuration with expected bit-width and resolutions for an exemplary embodiment;

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Embodiments of the invention include a method, apparatus, software or firmware, service, at least one circuit, and/or system for reducing the formatting overhead of reading, writing, and/or recovering errors in non-volatile computer-readable media (e.g., non-transitory computer-readable/writable media, such as a hard-disk drive, solid state drive, or the like). Some embodiments include digital correction of sync code words for known residual phase offsets, which allows for a reduced preamble requirement for data sectors. Some embodiments include correcting samples only into a sync mark detection circuit so that artifacts of digital interpolation do not affect data recovery.

Embodiments of the invention include interpolation during sync mark recovery to allow the sync mark recovery process to initiate before the phase slew from zero phase start (ZPS) has applied all changes through the latency incurred while feeding back the clock adjustment to the analog/digital converter (ADC) sampler.

In current channels, sync mark detection performance is compromised if sync mark detection begins prior to the full settling of phase correction as calculated by zero phase start at the A/D output.

In embodiments of the invention, by interpolating the sync mark by the magnitude of the phase correction calculated by the ZPS circuit and walking the interpolation back to zero in step with the latency of the phase update loop, the amount of preamble can be reduced by the length of the sync mark. The requirement to settle the total phase correction determined by ZPS moves from the first sample of the sync mark to the last sample of the sync mark.

In embodiments of the invention, by correcting A/D samples presented to the sync mark detection circuit for residual phase correction calculated by the zero phase start circuit as well as gain and offset corrections computed during the acquire process, the length of required preamble can be reduced by the length of the sync mark. The requirement to settle phase correction prior to the first sample of sync mark becomes the last sample of sync mark.

In some embodiments, since digital interpolator circuits tend to low-pass filter the input signal stream, the samples into the sync mark detector are corrected, whereas the samples into the data recovery data are not altered.

Figure 1:
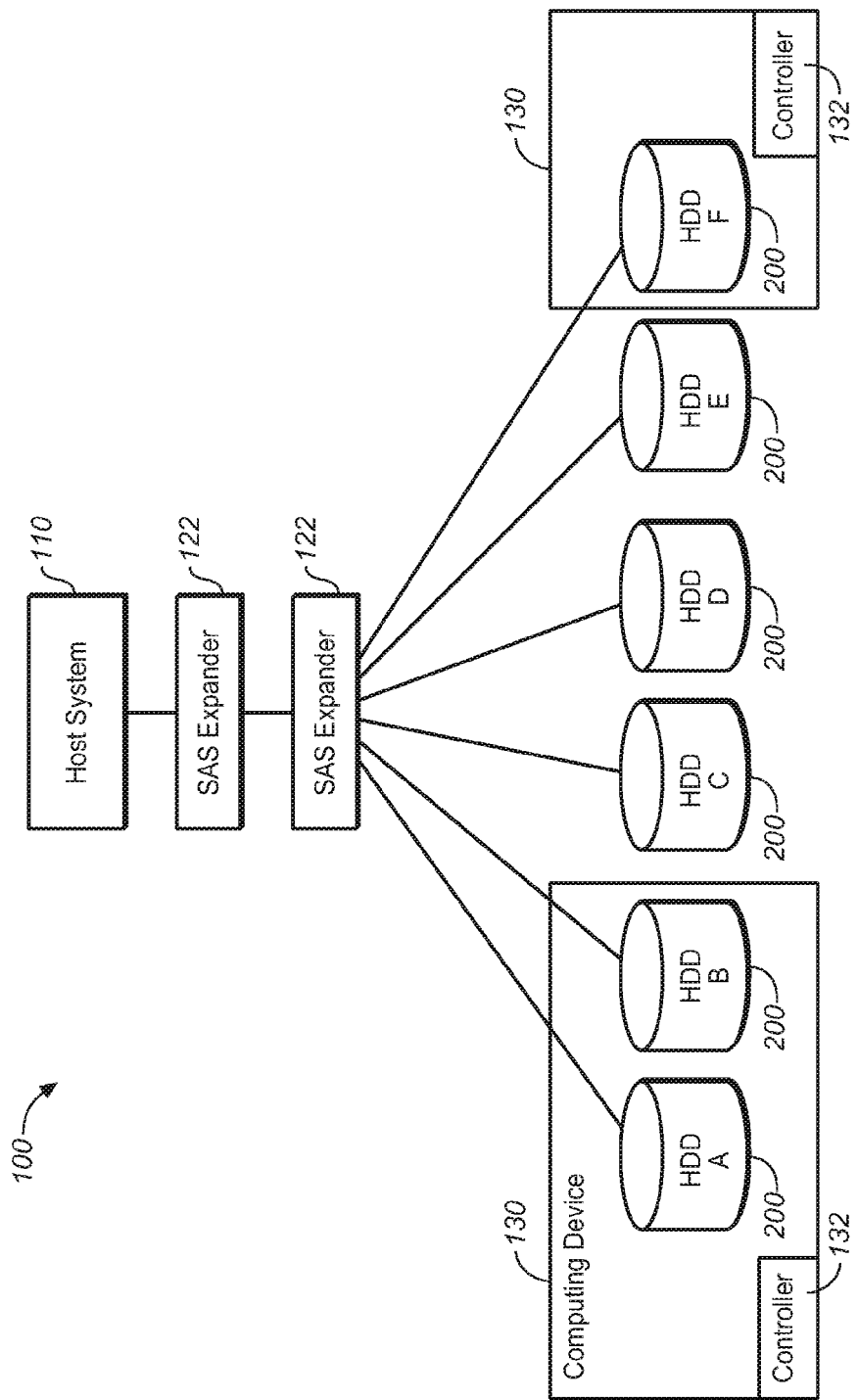
FIG. 1 shows an exemplary communicatively coupled system topology.

Referring to FIG. 1, an exemplary communicatively coupled system topology 100 including a host system 110, a plurality of expanders 122 (such as Serial Attached Small Computer System Interface (SAS) expanders, or the like), a plurality of computing devices 130 (such as storage systems), and a plurality of storage devices 200 (e.g., hard disk drives (HDDs) 200, solid state drives, cache storage media, or the like (in various configurations and arrangements)) is depicted. For example, each computing device 130 can include one or more controllers 132 (such as a storage controller, or the like) and one or more storage devices 200 (such as HDDs, solid state drives, cache, or the like), as well as any other computer components (not shown), such as one or more processors, one or more network cards, one or more busses, one or more memories, cache, software, firmware, a power supply, wired or wireless connectivity to other devices, or the like. In some exemplary embodiments, one or more of the computing devices 130 are implemented as a RAID (a redundant array of independent disks or a redundant array of independent storage devices) system, wherein the one or more of the storage devices 200 (e.g., hard disk drives, solid state drives, a cache storage medium, or the like) are implemented in a RAID configuration; in some exemplary embodiments, the controller 132 of the RAID system comprises a RAID-enabled controller.

Figure 2:
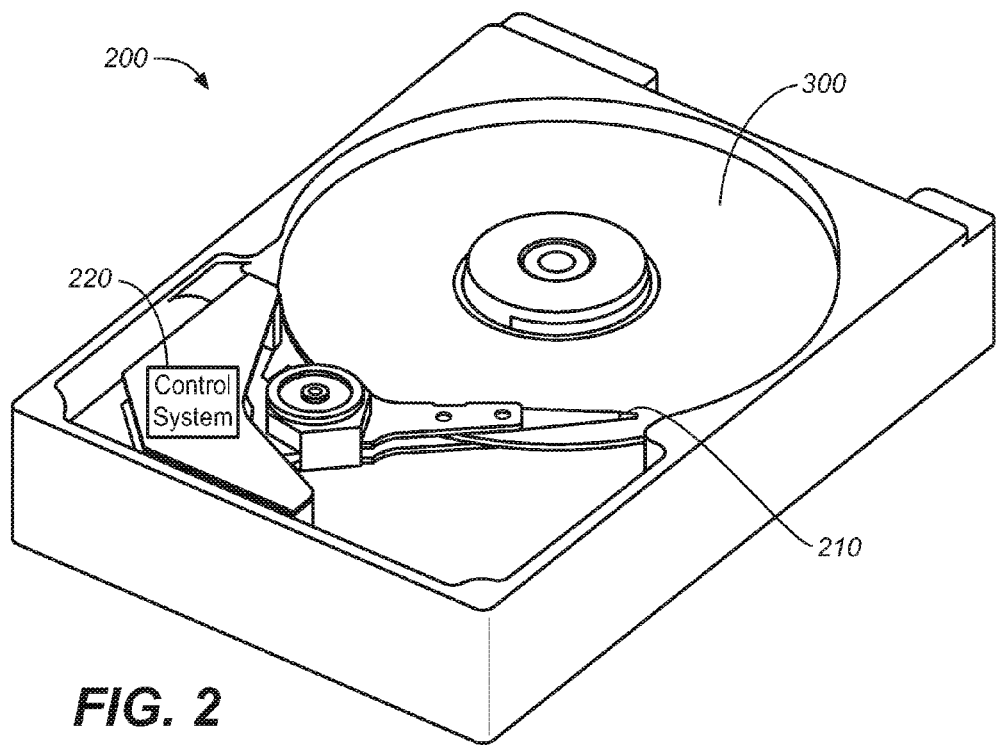
FIG. 2 shows an exemplary storage device.

Referring to FIG. 2, an exemplary hard disk drive 200 suitable for embodiments of the invention is depicted. The hard disk drive 200 includes one or more platters 300, one or more read/write heads 210, and a control system 220, as well as other components known to one of ordinary skill in the art. Each of the one or more read/write heads 210 includes one or more magnetic heads configured to read and write raw data streams to a particular platter 300 of the hard disk drive 200. In embodiments of the invention, the control system 220 includes one or more electronic circuits. The one or more electronic circuits can comprise a phase-locked loop circuit (such as a digital phase-locked loop or an all-digital phase-locked loop).

Figure 3:
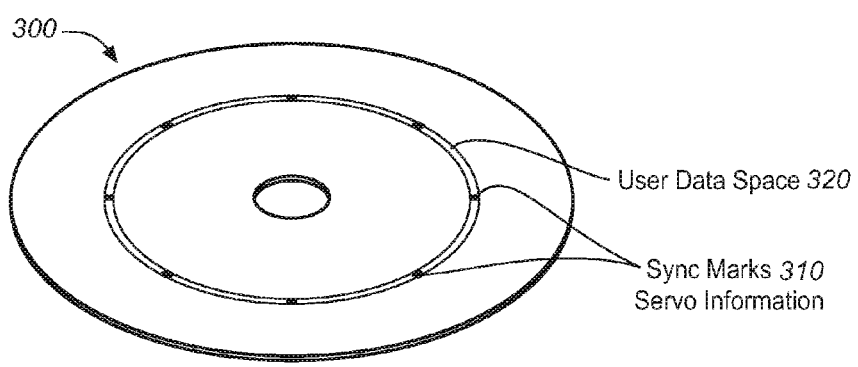
FIG. 3 shows an exemplary platter of a hard disk drive.

Referring to FIG. 3, an exemplary platter 300 of a hard disk drive 200 is depicted. The platter 300 includes a plurality of user data spaces 320 and a plurality of sync marks 310. Each of the plurality of sync marks 310 provides servo information configured to be read by a read/write head 210. A sync mark is a field that allows for the detection of the first bit of a particular user data space. This servo information is used by the control system 220 for the synchronization and timing of read/write events.

While FIGS. 1-3 depict an exemplary embodiment implemented within one or more storage devices 200 (e.g., one or more hard disk drives or components thereof), one of ordinary skill in the art will appreciate that other embodiments may comprise different implementations without departing from the scope or spirit of the disclosure. For example, some embodiments may be applied to, implemented in, and/or implemented as circuits, methods, apparati, systems, and/or computer-executable instructions of or for digital signal processing (DSP), coding, read channels, storage systems (such as RAID systems or the like) or the like; furthermore, some embodiments may include one or more virtualized hard disk drives implemented on another storage device (such as a solid state drive) or a virtualized circuit performing a method of some embodiments.

Referring to FIG. 4, an exemplary interval diagram of an exemplary fragment 401 of an exemplary data sector 400 of some embodiments showing a preamble 402 and user data is depicted. In some embodiments, the data sector 400 comprises a single fragment 401. The preamble 402 may comprise a training pattern, which is a known/predetermined pattern (e.g., a repeating pattern of "1100", such as "11001100110...1100", or the like). In some embodiments the preamble 402 may have a length of 2 T (where "T" is a temporal frequency (i.e., the inverse of a frequency); i.e., where T=1/(data rate)). In some embodiments, the preamble 402 corresponds to performing a ZPS/ZGS cycle and an acquisition cycle. For example, in an exemplary embodiment, during or corresponding to a fragment 401, a full ZPS/ZGS cycle and acquisition cycle includes a plurality of intervals and read-back of user data. During a ZPS/ZGS interval, the read channel accumulates an incoming signal. During a ZPS/ZGS Calculation Interval, the read channel measures phase and gain of the incoming signal. During a Phase Slew/Gain Adjust Interval, the read channel aligns a system clock to that of the incoming signal and adjusts a gain; the length of time required to complete the third interval is in part a function of the difference of the system clock phase and the phase of the incoming signal. During an Acquire interval, the read channel makes fine adjustments to the system clock to align the incoming signal and makes fine gain adjustments. It should be noted that the fourth interval may overlap with the third interval. During a Post Acquire interval, the system continues making fine adjustments to the system clock and for one or more sync marks. During a Sync Mark interval, the read channel acquires the sync mark information; a sync mark is a field that allows for the detection of the 1st bit of user data. User data follows the aforementioned intervals included in the fragment. While FIG. 4 shows an exemplary fragment 401 of an exemplary embodiment, some embodiments may include shorter (or longer) preambles and the corresponding performance of ZPS/ZGS cycle and acquisition cycle may also be shorter or longer; for example, in exemplary embodiments, the performance of particular cycles or intervals may be overlapped, bypassed, or otherwise skipped to reduce the necessary size or length of a preamble; furthermore, some embodiments may include the performance of other intervals or cycles.

At the system level, if effects of bit error and sector failure rate are neglected, the minimum size of the preamble length is generally dictated by 1) a DPLL phase slew limitation via gross phase acquisition and reacquire cycle (e.g., via zero phase start/phase rotation) and 2) an acquire timing limitation. (Phase rotation includes a synthesizer phase alignment via incremental change to the sampling phase and is generally subject to a maximum rate of sampling phase change.)

The minimum size of the preamble length is partially limited by a DPLL phase slew limitation via gross phase acquisition and re-acquire cycle (e.g., via zero phase start/phase rotation). When a read event starts, the DPLL initiates a gross phase acquisition and re-acquire cycle (e.g., a zero phase start). The zero phase start, for example, includes integrating a particular number of samples (e.g., 8, 16, or 32 samples, or the like), and a discrete Fourier transformation (DFT) is computed at the temporal frequency of the preamble (e.g., a fundamental frequency of $\frac{1}{4}^{th}$ of the read sampling rate). Based upon the DFT computation, the digital phase-locked loop solves for the phase difference between the current sampling phase and the desired sampling phase. After solving for the phase difference, the DPLL slews the sampling phase at a particular rate until the correct sampling phase is reached. For example, in some implementations, after solving for the phase difference, the DPLL slews the sampling phase at a predetermined rate (e.g., a rate of approximately $\frac{1}{64}^{th}$ of the read sampling rate) until the correct sampling phase is reached; however, it is fully contemplated that the DPLL may slew the sampling phase at any suitable rate (whether fixed, constant, variable, accelerating, decelerating, or the like) until the correct sampling phase is reached. Furthermore, embodiments of the invention include completing this process before sampling the sync mark.

Secondly, the minimum size of the read fragment preamble length is partially limited by acquire timing. The sync mark detection circuit uses the falling edge of the acquire period to begin searching for the sync mark. Typically, the acquire period starts after the gross phase acquisition computation (e.g., ZPS computation) has finished and is normally set to cover the majority of the preamble. However, some embodiments include gross gain acquisition (or zero gain start) beginning (and/or occurring during) at the same time as and on the same samples as the ZPS sample; in such embodiments, calculating the zero gain start at the same time as zero phase start may be enabled or disabled in some implementations.

Embodiments of the invention increase the capacities of the read channel by reducing the required preamble length. The reduced preamble length provides system level improved formatting efficiencies as well as improvements to equivalent signal-to-noise ratio (SNR) results. Additionally, embodiments of the invention are configured to be adapted to future revisions of the read channel which may include further reductions to preamble length.

Referring now to FIGS. 5A-5B, flow diagrams 500A, 500B of exemplary circuit blocks of an exemplary read channel of an exemplary embodiment are shown. As depicted, the exemplary read channel may be configured for digitally correcting the input pattern for offsets in phase, gain, and DC that have not been corrected prior to sampling the input signal. For example, a system may receive an input signal 501 which is processed by a read channel which may include AC coupling circuit (ACC) 510, variable gain amplifier 520, baseline compensation 530, sampling circuit 540, analog-to-digital converter (ADC) 550, digital compensation circuit 560 (e.g. a digital corrector circuit), and a sync mark detector circuit 570.

Referring in particular to FIG. 5A, as exemplarily shown, the AC coupling circuit 510 receives the input signal 501. The variable gain amplifier 520 alters the amplitude of the signal. The baseline compensation 530 alters the DC offset level of the signal. The sampling circuit 540 (or sample/hold circuit) samples the signal at a given sampling phase. In exemplary embodied systems, it can take some number of bit intervals (e.g., roughly 20 bit intervals in some implementations) to get a signal 501 from input at the ACC 510 to an output of the ADC 550. During the ZPS/ZGS interval, the current phase of the input signal 501 and current amplitude of the input signal 501 is measured at the output of the ADC 550. In some embodiments, this requires 16 or 32 samples to get a reliable measurement for phase and amplitude, while in other embodiments a different quantity (e.g., more or less) of samples may be required. Once the measurement is made, the read channel will proceed to correct the input signal in the analog front-end (AFE). However this can require time because: a) the output of the ADC was sampled some time ago (e.g., it may take roughly 20 bits); and b) the sampling phase correction must be applied slowly (i.e., the sampling phase cannot be instantly changed by more than a small amount). At the end of the ZPS/ZGS interval, the following is determined or determinable: a) the difference between the current sampling phase and the desired sampling phase; and b) the difference between the current amplitude at the output of the ADC 550 and the desired amplitude.

In some embodiments, during the acquisition interval, the read channel will slowly change the sampling phase to match the desired sampling phase (which in some circumstances may take up to 32 bit intervals (or longer) to get to the final sampling phase).

Referring in particular to FIG. 5B, in exemplary embodiments a digital compensation circuit 560 is included between the ADC 550 and the sync mark detector 570; such an implementation is enabled to digitally correct for the difference of the desired sampling phase, amplitude and offset, and that of when the sample was measured. Such an implementation allows for not being required to wait until the acquire phase is completed to have a sync mark present in the input stream (and allows for a shorter acquisition interval).

Referring still to FIG. 5B, in some embodiments, where the digital compensation circuit 560 (e.g., a digital correction circuit) is inserted between the ADC 550 and the sync mark detector 570, the digital compensation circuit includes a digital interpolator, multiplier, and offset adjustment. In such embodiments, the interpolator automatically shifts signal phase by a difference of corrected phase at output of a phase loop and a phase at the time the digital sample was taken. The multiplier automatically adjusts the signal by the ratio of the current gain loop correction and the correction at the time the sample was taken. The offset adjustment automatically adjusts the signal by the difference of the output of the current offset correction and the correction at the time the sample was taken. As a net result, the digital compensation circuit 560 (e.g., digital correction circuit) corrects the signal using information which was not applied when the sample was taken. As such, a user does not need to interact with the correction circuit for the circuit to function.

Referring still to FIGS. 5A-5B, the following example of operation is provided. If, for example, at the end of ZPS/ZGS, a ½ sampling interval phase error (½ T) and an amplitude error (denoted as A %) is measured, at the start of acquisition (ACQ) the read channel will evenly adjust/change the sampling phase with a maximum slew rate as follows:

ACQ sample 0: 0 T sampling phase offset
ACQ sample 1: 1/N T sampling phase offset
ACQ sample 2: 2/N T sampling phase offset
. . .
. . .
ACQ sample (½)N: (½ T) sampling phase offset.
In a particular example, N may equal 64; while in other embodiments N may equal any other data value (e.g., a positive integral data value or an even positive integral data value). Additionally, while this particular example demonstrates a sampling interval phase error of ½, it should be noted that embodiments of the invention may operate on and be applied to any measured sampling interval phase error.

Also, for example, the gain change can be applied all at once at/after a delay (denoted as "D"), as follows:
ACQ sample 0: 1.0× adjustment to the signal amplitude.
ACQ sample D: (1+A/100)× adjustment to the signal amplitude.
In a particular example, D may equal 8 (which represents a delay of 8 T), while A may correspond to 30% amplitude error; while in other embodiments D and A may equal any other data value.

However, in some embodiments, the analog-to-digital conversion has a latency (denoted as (M) T, wherein M is a data value (e.g., an integral data value) before finishing, which makes ACQ sample 0 get applied at end of ZPS/ZGS+(M) T at the output of the ADC 550. Therefore, the digital compensation circuit 560 (e.g., a digital correction circuit) will adjust the phase as follows:

ACQ sample 0 ADC output: adjust sampling phase by ½T.
ACQ sample 1 ADC output: adjust sampling phase by ½T.
. . .
ACQ sample (M−1) ADC output: adjust sampling phase by ½T.
ACQ sample M ADC output: adjust sampling phase by ½T−1/N T.
ACQ sample (M+1) ADC output: adjust sampling phase by ½T−2/N T.
. . .
ACQ sample (M+N/2−1) ADC output: adjust sampling phase by 1/N T.
ACQ sample (M+N/2) ADC output: adjust sampling phase by 0 T.

In a particular example, N may equal 64, and M may equal 20; while in other embodiments N and M may equal any other data values.

Additionally, the digital compensation circuit 560 (e.g., a digital correction circuit) may adjust the gain as follows:

ADC sample 0 ADC output: adjust gain by 1.3×.
. . .
ADC sample (M+D−1) ADC output: adjust gain by 1.3×.
ADC sample (M+D) ADC output: adjust gain by 1.0×. (~i.e., wherein ADC sample (M+D) corresponds to (M) T (i.e., for ADC to finish)+(D) T (i.e., delay for gain adjustment to ACQ sample))

In a particular example, M may equal 20, and D may equal 8; while in other embodiments M and D may equal any other data values.

In currently implemented read channels, signal would not be adjusted at input of sync detector until (N+M/2) T past the end of ACQ; however, in implementations which utilize the read channel of embodiments of the invention, signal may be adjusted at the beginning of ACQ.

Figure 6:
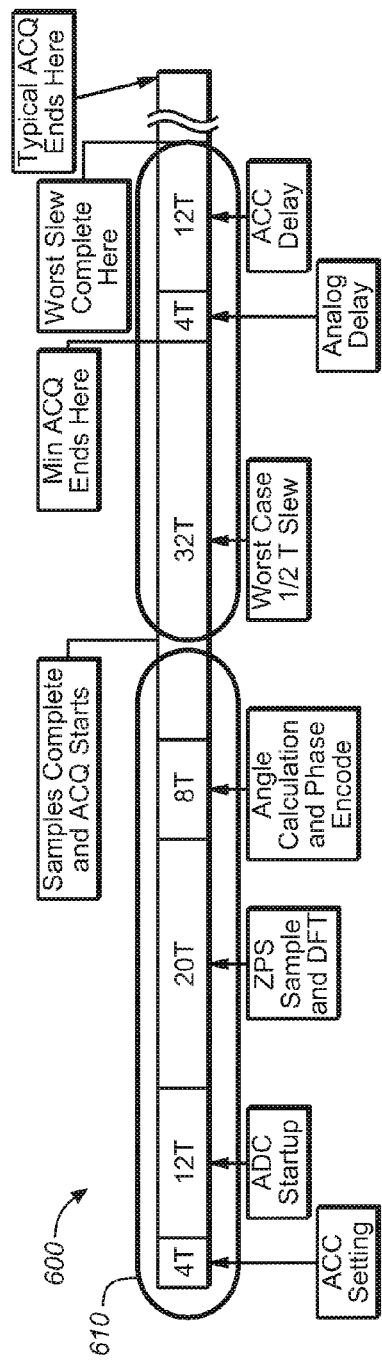
FIG. 6 shows a currently implemented preamble.

Referring now to FIG. 6, an exemplary currently implemented preamble 600 is depicted. The preamble 600 of FIG. 6 demonstrates how the preamble 600 is currently consumed. The currently implemented preamble 600 requires a total length of 92 bits to complete all phases of ZPS (with the worst-case slews on the analog-to-digital converter (ADC) output) before the sync mark; this time varies, depending especially on phase slew settling and also on assumptions made regarding frequency offset, analog delay, etc. Currently, acquire interval (ACQ) lengths typically form the majority of the preamble length. As exemplarily depicted in FIG. 6, a region 610 of the currently implemented preamble includes: AC-coupling (ACC) settling with a length of 4 bits; analog-to-digital converter (ADC) startup with a length of 12 bits; zero phase start (ZPS) sampling and discrete Fourier transformation (DFT) calculations with a length of 20 bits; angle calculation and phase encode with a length of 8 bits; and in some cases a portion of slew adjustment. Additionally, the 92 bit preamble 600 includes worst-case slew (for ½ T maximum phase error, where T=1/(data rate), which can also be described as ½ bit period maximum phase error or ½ sampling clock cycle maximum phase error) with a length of up to 32 bits; analog delay with a length of 4 bits; and ADC delay with a length of 12 bits. Embodiments of the invention include reducing the length of the preamble corresponding to events during the region 610 of the currently implemented preamble 600. While the exemplary preamble 600 described with respect to and illustrated in FIG. 6 shows a particular currently implemented preamble having particular bit lengths, embodiments of the invention may be implemented with any suitable preamble; for example, suitable preambles for some embodiments may include a preamble having different (e.g., more or less) intervals, a preamble having a different (e.g., longer or shorter) overall bit length, different configurations of intervals (e.g., a preamble which includes some but not all of the exemplarily described intervals, a preamble which includes one or more intervals which are not described with respect to the aforementioned exemplary preamble 600, a preamble which includes a different order of some or all of the intervals, a preamble whereby some or all of the intervals are overlapped (e.g., partially or fully overlapped) or performed concurrently, different (e.g., longer or shorter) lengths of particular intervals, a split preamble whereby preamble sub-sections are performed at different times, or the like.

Figure 7:
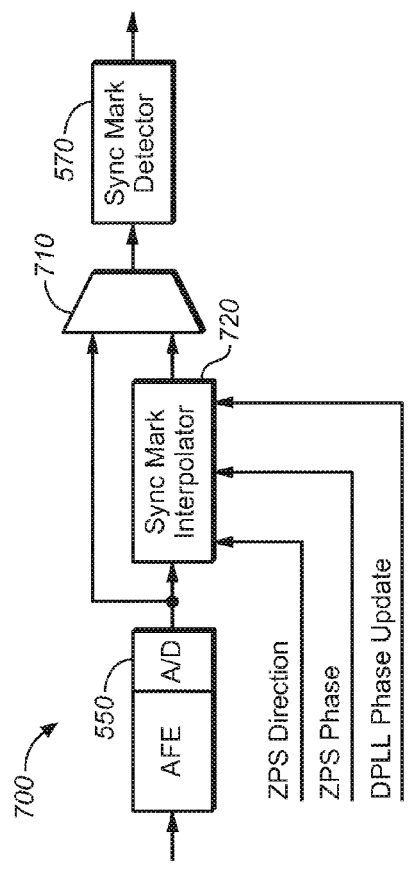
FIG. 7 shows a high level block diagram of how the sync mark interpolation circuitry fits in a system of some embodiments.

Referring now to FIG. 7, a high level block diagram of how the sync mark interpolation circuitry fits in a system 700 of some embodiments is shown. As depicted in FIG. 7, the sync mark interpolator operates on the ND (analog/digital) samples from the analog-to-digital converter 550. The sync mark interpolator 720 uses the direction of the ZPS slew to perform an initial setup of the interpolator; this is discussed in more detail below. The sync mark interpolator also uses the ZPS calculation to determine initial rotation of the incoming ND data. The sync mark interpolator 720 will use the DPLL (digital phase-locked loop) phase updates to determine the rate in which to de-rotate the ND samples. The circuitry includes a selectable means 710 (e.g., a multiplexer) to bypass the sync mark interpolator 720 completely via a register bit setting. Not specifically shown is a gain and DC compensation ability that can be applied to the ND input signal before any interpolation takes place.

Referring now to FIG. 8, a block diagram of the sync mark interpolator 720 of an exemplary embodiment is shown. The basic signal flow through the block shown in FIG. 8 starts with a DC compensation circuit 820 and gain compensation circuit 810. These circuits 810, 820 provide the functionality of a Smith predictor to correct for DC and gain changes in an effective low-latency manner. These circuits (e.g., "M-S DC" and "M-S Gain") are sometimes referred to as "master-slave" loops. After DC and gain compensation the signal flows through a conditional pipeline delay. This delay is determined at a ZPS (zero phase start) calculation time based on the direction the DPLL needs to slew for ZPS (i.e. advance or retard); this is discussed in more detail below. The actual fractional delay is performed by the fractional delay filter 840 (e.g., a Farrow structure fractional delay filter). This filter is fed the compensated ADC (analog-to-digital converter) samples and the amount of delay that is required. The output is the fractionally delayed data that is fed to the sync mark detector. The fractional delay required is calculated by the "Interpolation Control" block 830. This block 830 is essentially part of a Smith predictor for timing phase changes. The Interpolation Control block 830 detects the changes being fed from the DPLL (digital phase-locked loop) (referenced before ZPS) and compensates by providing predicted changes while the longer latency timing loop is being fed back to the AFE (analog front-end) and propagating to the ADC sampling circuitry.

Some embodiments incorporate suitable interpolation performance in the signal spectrum to constitute reasonable patterns for the sync mark in addition to signal spectrum of preamble. This may be accomplished with minimal group delay as the interpolation distance required will time vary in a relatively quick manner. That is, during the ZPS period the signal sampling phase may vary at a predetermined rate (e.g., in some implementations, a rate of approximately 1/N (e.g., $1/64^{th}$ of a T) per sample. Keeping the group delay of the filter 840 (since this is typically related to filter memory) small enables the filter 840 to better track these quick phase variations. In some embodiments, a filter 840 may be implemented that effectively reconstitutes samples in memory to account for updates to required phase interpolations, but this would be costly from a hardware prospective.

In some embodiments, the interpolation filter 840 comprises a Farrow structure. In some embodiments, the Farrow filter comprises an order 3 filter, which meets performance requirements at larger interpolation phases. For example, in particular implementations where the filter 840 is an order 3 filter, the filter delay may be between one and two T depending on the amount of interpolation being performed; because taking this memory into account and realizing that the round trip latency back to the analog front end from the DPLL cannot be perfectly accounted for and matched, in some embodiments, an exemplary step size of 1/16th may be selected for the interpolation phase quantization.

Referring now to FIG. 9, a block diagram of a circuit 900, which is where gain adjustment is performed on the incoming data and which is part of an overall Smith predictor for gain, of an exemplary embodiment is shown. The gain adjustment block 810 multiplies the incoming signal by the amount of gain change that is estimated to have occurred but has yet to make it through the latency of the AFE (analog front-end), ADC 550, and DVGA 520 (digital variable-gain amplifier). It is important to note that the delay block should be selected to mimic this latency as best as possible. Because some embodiments of the circuitry work off the difference between the DVGA gain value being sent to the AFE and the delayed version of this gain, the entire delay pipeline should be initialized in such embodiments with the starting value of the gain before any gain updates are made for the fragment. This would be the value before ZGS (zero gain start) takes place, or if ZGS is not enabled, before the first update going to the AFE. The circuit should be active and work on the very first gain value update, whether it is a ZGS update (if enabled) or a normal update. Not explicitly shown in FIG. 9, but assumed in the exemplary implementation, is a register programmable means (e.g., a multiplexer) to bypass the gain adjustment circuitry. The bit widths and resolutions for the signal path in the gain adjustment block 810 are noted on the block diagram of FIG. 9.

Figure 10:
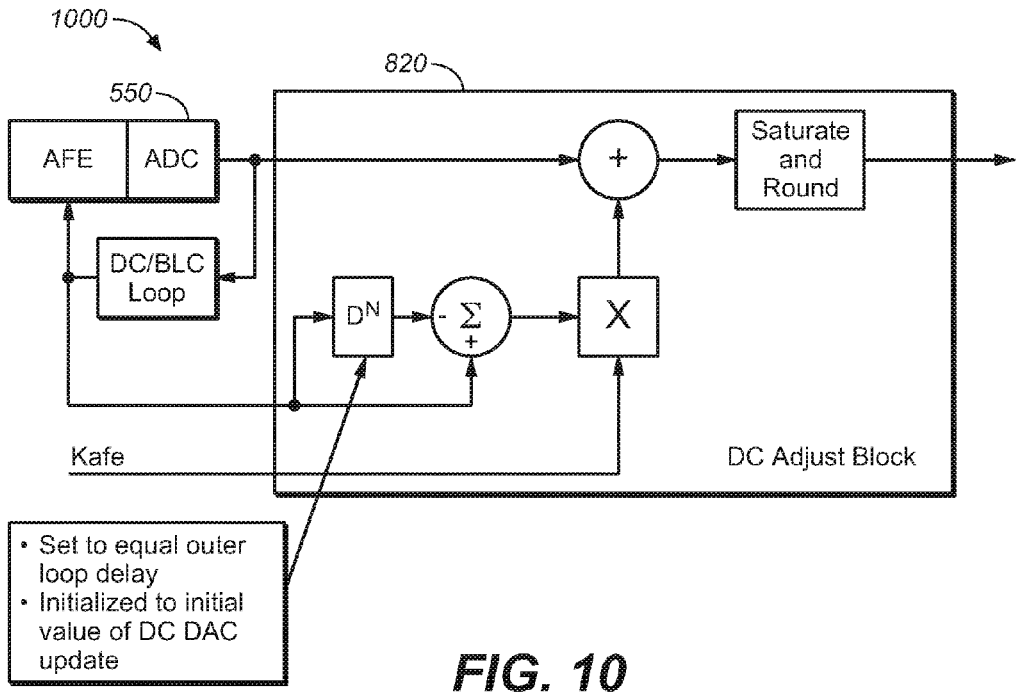
FIG. 10 shows a block diagram of the circuitry of an exemplary embodiment.

Referring now to FIG. 10, a block diagram of the circuitry 1000 of an exemplary embodiment is shown. Like the "Gain Adjustment" block 810 (described above), the "DC Offset Adjustment" block 820 works on the same principles. The DC offset change is calculated and part of a Smith predictor is implemented to perform DC adjustment with shorter latency than of the DC loop.

Still referring to FIG. 10, the DC adjustment block 820 offsets the incoming signal by the amount of DC change that is estimated to have occurred but has yet to make it through the latency of the AFE, ADC 550, and the DC/BLC circuitry. It is important to note that the delay block should be selected to mimic this latency as best as possible. Since the circuitry works off the difference between the DC/BLC offset value being sent to the AFE and the delayed version of this offset, it is important to initialize the entire delay pipeline with the starting value of the DC/BLC feedback before any DC updates are made for the fragment. This would be the value before the first update going to the AFE. The circuit should be active and work on the very first DC value update applied to the AFE. Not explicitly shown in FIG. 10 is a register programmable means (e.g., a multiplexer) to bypass the DC adjustment circuitry. The bit widths and resolutions for the signal path in the DC adjustment block 820 are noted on the block diagram shown in FIG. 10. After the DC offset difference is computed, it is multiplied by a Kafe factor that is sent to the block. This factor accounts for the DC gain through the CTF (continuous time filter, also known as an anti-aliasing filter) and ADC such that the offset can be computed more accurately to the actual outer loop dynamics. This DC adjustment block 820 saturates and rounds the result of the multiplication.

Figure 11:
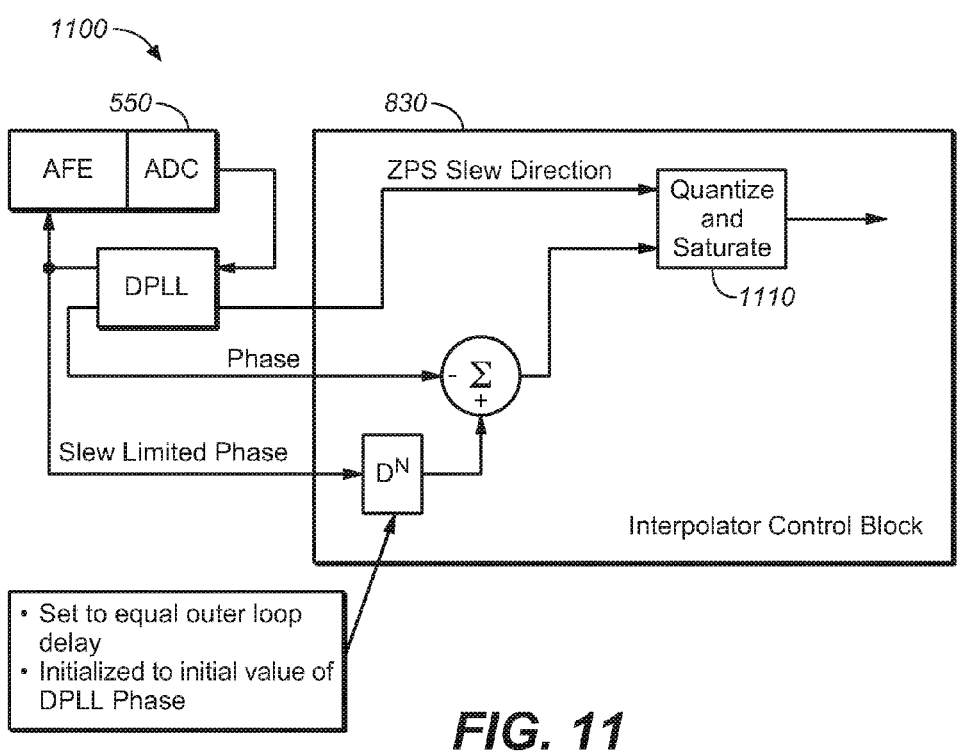
FIG. 11 shows a block diagram for the "Interpolation Control" block of an exemplary embodiment.

Referring now to FIG. 11, exemplary circuitry 1100 associated with the "Interpolation Control" circuit 830 of an exemplary embodiment is shown. The "Interpolation Control" block 830 is responsible for providing the fractional delay needed for use by the fractional delay filter 840. The "Interpolation Control" block 830 is part of a Smith predictor in the timing loop. Much like the gain compensation circuit 810 and DC compensation circuit 820, described above, the fractional delay calculated for the filter 840 is based on a difference of the adjustment sent to the AFE (analog front-end) by the DPLL (digital phase-locked loop) and a matched delay version of that adjustment value.

Figure 12:
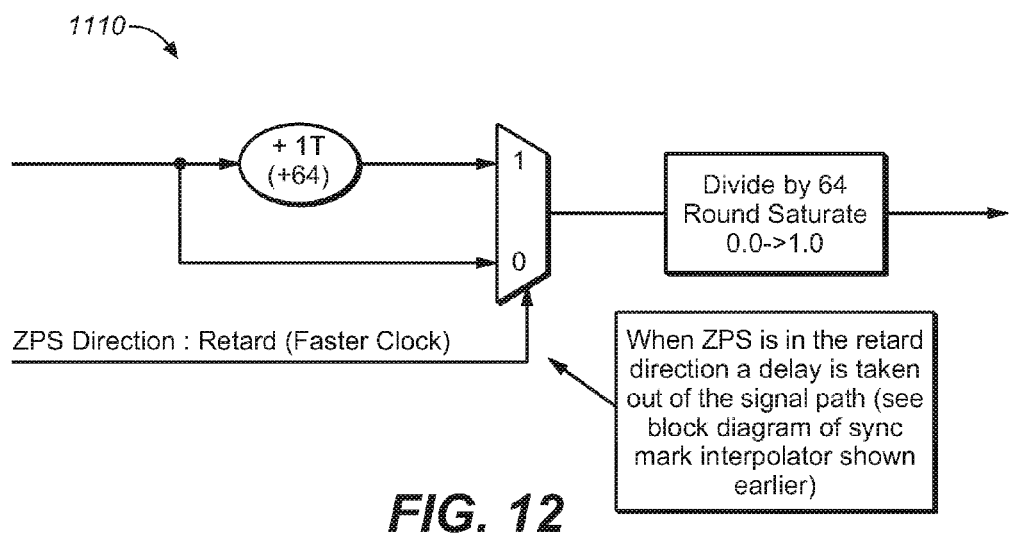
FIG. 12 shows a block diagram of the "Quantize and Saturate" block of an exemplary embodiment.

Referring now to FIG. 12, a block diagram of the "Quantize and Saturate" circuit 1110 of an exemplary embodiment is depicted. The "Interpolator Control" circuit 830 makes/performs a prediction based on the difference between the phase calculated by the DPLL and the update of that phase being represented to the sync mark interpolator 720. That is, a compensation for the latency of the timing loop from the point of phase update calculation to the actual update being properly recognized at the ADC sampler and propagating to the sync mark interpolation circuitry 720. The delay block shown in the block diagram of FIG. 12 should be selected to mimic this latency. It is important that the delay pipeline is primed with the initial phase before any updates from the current event take place. It is also important to note that the DPLL phase register can get updated with phase steps much larger than that allowable to be fed back to the front end. For this reason the DPLL has a slew-limiting feature which spreads, what would have been large instantaneous changes, in smaller steps over a longer time interval. The difference used by the "Interpolator Control" circuit 830 should be the unlimited phase register versus the actual limited updates being sent to the AFE. This accounts for both the hard latency of the loop and the effective latency introduced by the slew limiting circuitry. The difference in phase calculated by the block, along with the direction (advance or retard) of the ZPS slew is sent to the "Quantize and Saturate" circuit 1110. This "Quantize and Saturate" circuit 1110 converts the incoming information to a phase delay to be sent to the actual fractional delay filter 840.

Referring generally now to FIGS. 10-11, in exemplary embodiments, the "Interpolation Control" 830 has been designed to accommodate and correct for phase shifts from an effective −0.05 T to an effective 0.5 T. The "Interpolation Control" circuit 830 provides the delay input to the fractional delay filter 840. This requires an input ranging from 0 to 1. The positive delay is accomplished by simply sending the fraction between 0 and 0.5. The negative delay is accomplished by removing 1 T of delay from the signal path and then sending a fraction between 0.5 and 1 T. This gives an overall calculated range of "−1 T+(0.5 T to 1 T)" or −0.5 T to 0T (that is the negative delay portion of the shift).

Referring now to FIG. 13, an exemplary overall block diagram of a circuit 1300 including the fractional delay filter 840 of an exemplary embodiment is shown. The fractional delay filter 840 is comprised of two parts, an integer delay of either 0 T or −1 T and a fractional delay in the range of either 0.0 T to 0.5 T or 0.5 T to 1.5 T. The first respective parts are no integer delay and a fractional delay of 0.0 T to 0.5 T. This represents the amount of "advance" (slow the frequency and sample further in time) that the filter can attain. The second respective parts consist of an integer delay of −1 T and a fractional delay of 0.5 T to 1.0 T. Taken together, this represents a total fractional delay in the range of −0.5 T to 0.0 T. This delay represents the amount of "retard" (increase the frequency and sample closer in time) that the filter 840 can attain.

Referring now to FIG. 14, an exemplary block diagram illustrates the configuration with expected bit-width and resolutions for an exemplary embodiment. The Farrow structure filter in this design consists of a linear combination of four 4-Tap FIR filters with simple coefficients.

Figure 15:
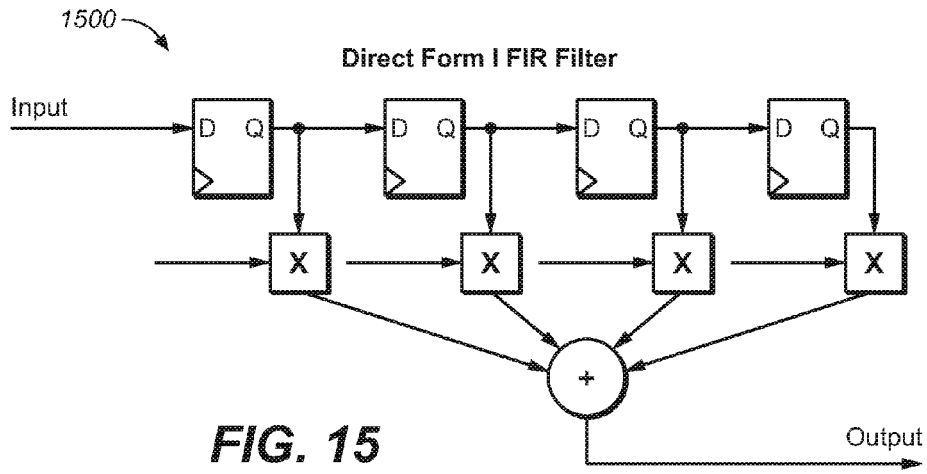
FIG. 15 shows an exemplary diagram of an exemplary embodiment illustrating the mapping of the coefficients to a direct form I representation of the FIR filter.

Referring now to FIG. 15, an exemplary diagram 1500 of an exemplary embodiment shows the mapping of the coefficients to a direct form I representation of the FIR filter 840. It should be noted that the designer is free to use any representation of the filter whether it be the transposed or direct forms. It should also be noted that the design is shown as a full rate implementation. Any polyphase representation or other parallelization technique may be used to reduce the filter to a ¼ rate implementation. In addition, the filter 840 is shown as a Farrow structure, but in some embodiments may be transformed to an equivalent single 4-Tap FIR with a 16×4 matrix of coefficients. In such an implementation, the coefficients would need to be time-multiplexed and care would be needed to make sure the pipelined coefficients are time-aligned properly to the respective input samples; in such an implementation, the coefficients become more complex and cannot be as easily shared across the pipeline stages.

Figure 16:
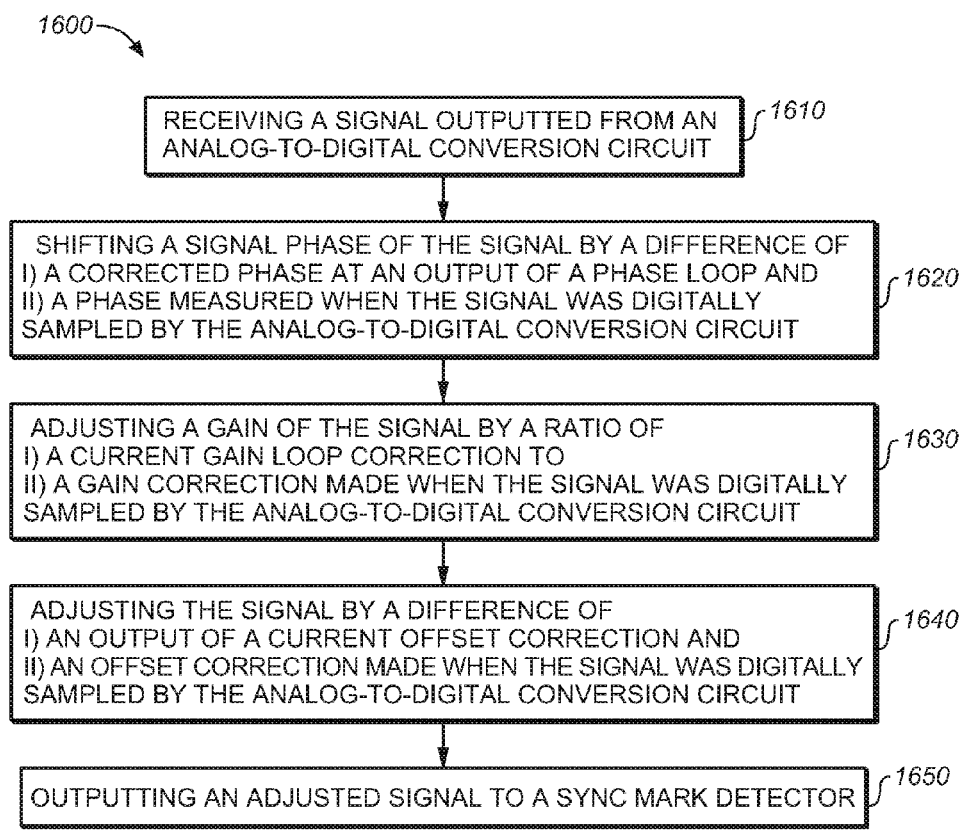
FIG. 16 shows a flow diagram of a method of some embodiments.

Referring to FIG. 16, an embodiment of the invention includes a method 1600 for providing format savings in fragments of data sectors. It is contemplated that embodiments of the method 1600 can be performed by a control system 220; a read channel of a storage device 220 or storage system; at least one component, circuit, or module of the control system 220, of a storage device 200, of a storage device, or of a computing device; software or firmware executed on a computing device (such as the control system 220, a controller, a storage device, a storage system, or a processor); other computing devices; other computer components; or on other software, firmware, or middleware of the system topology 100. The method 1600 can include any or all of steps 1610, 1620, 1630, 1640, and/or 1650, and it is contemplated that the method 1600 can include additional steps as disclosed throughout, but not explicitly set forth in this paragraph. Further, it is fully contemplated that the steps of the method 1600 can be performed concurrently or in a non-sequential order. Likewise, it is fully contemplated that the method 1600 can be performed prior to, concurrently, subsequent to, or in combination with the performance of one or more steps of one or more other embodied methods disclosed throughout.

Embodiments of the method 1600 include a step 1610, wherein the step 1610 comprises receiving a signal outputted from an analog-to-digital conversion circuit. Embodiments of the method 1600 also include a step 1620, wherein the step 1620 comprises shifting a signal phase of the signal by a difference of i) a corrected phase at an output of a phase loop and ii) a phase measured when the signal was digitally sampled by the analog-to-digital conversion circuit. Embodiments of the method 1600 further include a step 1630, wherein the step 1630 comprises adjusting a gain of the signal by a ratio of i) a current gain loop correction to ii) a gain correction made when the signal was digitally sampled by the analog-to-digital conversion circuit. Embodiments of the method 1600 include a step 1640, wherein the step 1640 comprises adjusting the signal by a difference of i) an output of a current offset correction and ii) an offset correction made when the signal was digitally sampled by the analog-to-digital conversion circuit. Embodiments of the method 1600 include a step 1650, wherein the step 1650 comprises outputting an adjusted signal to a sync mark detector. In some embodiments, the method 1600 includes performing one or more additional operations.

It should be noted that each of the storage system 100 or storage devices 200 may be implemented as a RAID (redundant array of inexpensive storage devices or redundant array of independent storage devices) based storage system. Additionally, each storage system 200 may be integrated into a larger storage system such as, for example, a RAID (redundant array of inexpensive storage devices or redundant array of independent storage devices) based storage system. Such a RAID storage system increases stability and reliability through redundancy, combining multiple storage devices as a logical unit. Data may be spread across a number of storage devices included in the RAID storage system according to a variety of algorithms and accessed by an operating system as if it were a single storage device. For example, data may be mirrored to multiple storage devices in the RAID storage system, or may be sliced and distributed across multiple storage devices in a number of techniques. If a small number of storage devices in the RAID storage system fail or become unavailable, error correction techniques may be used to recreate the missing data based on the remaining portions of the data from the other storage devices in the RAID storage system. The storage devices in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

As mentioned previously, the storage device configuration and storage system configuration can be varied in other embodiments of the invention. For example, the storage device 200 may comprise a hybrid HDD which includes a flash memory in addition to one or more storage disks.

In addition, one or more of the storage devices 200 may be coupled to or incorporated within a host processing device, which may be a computer, server, communication device, etc.

Multiple storage devices 200 (some or all possibly comprising various different types) may be incorporated into or implemented as a virtual storage system. The virtual storage system, also referred to as a storage virtualization system, comprises a virtual storage controller coupled to a RAID system, where RAID denotes Redundant Array of Independent storage Devices. In some embodiments, the RAID system more specifically comprises N distinct storage devices, one or more of which may be HDDs and one or more of which may be solid state drives. Furthermore, one or more of the HDDs of the RAID system are assumed to be configured to include read channel circuitry and associated error correction circuitry as disclosed herein. These and other virtual storage systems comprising HDDs or other storage devices are considered embodiments of the invention.

Embodiments of the invention may also be implemented in the form of integrated circuits. In a given such integrated circuit implementation, identical die are typically formed in a repeated pattern on a surface of a semiconductor wafer. Each die includes, for example, at least a portion of signal processing circuitry as described herein, and may further include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

It should again be emphasized that the above-described embodiments of the invention are intended to be illustrative only. For example, other embodiments can use different types, quantities, and arrangements of storage disks, read/write heads, read channel circuitry, signal processing circuitry, decoders, filters, detectors, and other storage device elements for implementing the described functionality. Also, the particular manner in which certain steps are performed in the signal processing may vary. Further, although embodiments of the invention have been described with respect to storage disks such as HDDs, embodiments of the invention may be implemented various other devices including optical data-storage applications and wireless communications. These and numerous other alternative embodiments within the scope of the following claims will be apparent to those skilled in the art.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
    receiving a signal outputted from an analog-to-digital conversion circuit; and
    shifting a signal phase of the signal by a difference of i) a corrected phase at an output of a phase loop and ii) a phase measured when the signal was digitally sampled by the analog-to-digital conversion circuit;
    adjusting a gain of the signal based at least upon i) a current gain loop correction and ii) a gain correction made when the signal was digitally sampled by the analog-to-digital conversion circuit;
    adjusting the signal based at least upon i) an output of a current offset correction and ii) an offset correction made when the signal was digitally sampled by the analog-to-digital conversion circuit; and
    outputting an adjusted signal to a sync mark detector.

2. The method of claim 1, wherein adjusting a gain of the signal based at least upon i) a current gain loop correction and ii) a gain correction made when the signal was digitally sampled by the analog-to-digital conversion circuit further comprises:
    adjusting a gain of the signal by a ratio of i) a current gain loop correction to ii) a gain correction made when the signal was digitally sampled by the analog-to-digital conversion circuit.

3. The method of claim 1, wherein adjusting the signal based at least upon i) an output of a current offset correction and ii) an offset correction made when the signal was digitally sampled by the analog-to-digital conversion circuit further comprises:
    adjusting the signal by a difference of i) an output of a current offset correction and ii) an offset correction made when the signal was digitally sampled by the analog-to-digital conversion circuit.

4. The method of claim 1,
    wherein adjusting a gain of the signal based at least upon i) a current gain loop correction and ii) a gain correction made when the signal was digitally sampled by the analog-to-digital conversion circuit further comprises:
    adjusting a gain of the signal by a ratio of i) a current gain loop correction to ii) a gain correction made when the signal was digitally sampled by the analog-to-digital conversion circuit; and
    wherein adjusting the signal based at least upon i) an output of a current offset correction and ii) an offset correction made when the signal was digitally sampled by the analog-to-digital conversion circuit further comprises:
    adjusting the signal by a difference of i) an output of a current offset correction and ii) an offset correction made when the signal was digitally sampled by the analog-to-digital conversion circuit.

5. The method of claim 4, wherein adjusting a gain of the signal by a ratio of i) a current gain loop correction to ii) a gain correction made when the signal was digitally sampled by the analog-to-digital conversion circuit further comprises:
    adjusting, after a delay, a gain of the signal by a ratio of i) a current gain loop correction to ii) a gain correction made when the signal was digitally sampled by the analog-to-digital conversion circuit.

6. The method of claim 1, wherein, as a result of: shifting the signal phase of the signal by the difference of i) the corrected phase at the output of the phase loop and ii) the phase measured when the signal was digitally sampled by the analog-to-digital conversion circuit; adjusting the gain of the signal based at least upon i) the current gain loop correction and ii) the gain correction made when the signal was digitally sampled by the analog-to-digital conversion circuit; and adjusting the signal based at least upon i) the output of the current offset correction and ii) the offset correction made when the signal was digitally sampled by the analog-to-digital conversion circuit, the signal is corrected by utilizing information which was not applied when the signal was digitally sampled by the analog-to-digital conversion circuit.

7. The method of claim 1, further comprising:
    determining an initial rotation of incoming analog-to-digital data based upon a zero phase start calculation; and
    determining a rate to de-rotate analog-to-digital samples based upon phase loop updates.

8. The method of claim 1, further comprising:
    receiving a selection to bypass an interpolator.

9. The method of claim 1, wherein outputting an adjusted signal to a sync mark detector further comprises:
    outputting a fractionally delayed adjusted signal to a sync mark detector.

10. The method of claim 1, further comprising:
    calculating a fractional delay; and
    providing the fractional delay to a fractional delay filter.

11. The method of claim 1, further comprising:
    performing a phase prediction based upon a phase calculated by the phase loop and an updated phase provided to an interpolator; and
    sending the phase prediction and an advance/retard direction to a quantize and saturate circuit.

12. The method of claim 11, further comprising:
converting the phase prediction and the advance/retard direction to a phase delay; and
sending the phase delay to a fractional delay filter.

13. The method of claim 12, wherein the fractional delay filter comprises an integer delay and a fractional delay.

14. A storage system, comprising:
an analog/digital conversion circuit;
a sync mark detector; and
a correction circuit, the correction circuit being coupled to the analog/digital conversion circuit and the sync mark detector, the correction circuit including a interpolator, a multiplier, and an offset adjustment means, wherein the correction circuit is configured to perform:
receiving a signal outputted from an analog-to-digital conversion circuit;
shifting a signal phase of the signal based at least upon i) a corrected phase at an output of a phase loop and ii) a phase measured when the signal was digitally sampled by the analog-to-digital conversion circuit;
adjusting a gain of the signal by a ratio of i) a current gain loop correction to ii) a gain correction made when the signal was digitally sampled by the analog-to-digital conversion circuit;
adjusting the signal based at least upon i) an output of a current offset correction and ii) an offset correction made when the signal was digitally sampled by the analog-to-digital conversion circuit; and
outputting an adjusted signal to the sync mark detector.

15. The storage system of claim 14, wherein the storage system is implemented as a RAID (redundant array of independent storage devices) system.

16. The storage system of claim 14, wherein the storage system comprises at least one hard disk drive.

17. A method, comprising:
receiving a signal outputted from an analog-to-digital conversion circuit;
shifting a signal phase of the signal based at least upon i) a corrected phase at an output of a phase loop and ii) a phase measured when the signal was digitally sampled by the analog-to-digital conversion circuit;
adjusting a gain of the signal based at least upon i) a current gain loop correction and ii) a gain correction made when the signal was digitally sampled by the analog-to-digital conversion circuit;
adjusting the signal by a difference of i) an output of a current offset correction and ii) an offset correction made when the signal was digitally sampled by the analog-to-digital conversion circuit;
performing a phase prediction based upon a phase calculated by the phase loop and an updated phase provided to an interpolator;
sending the phase prediction and an advance/retard direction to a quantize and saturate circuit;
converting the phase prediction and the advance/retard direction to a phase delay;
sending the phase delay to a fractional delay filter, wherein the fractional delay filter comprises an integer delay and a fractional delay; and
outputting an adjusted signal to a sync mark detector.

18. The method of claim 17, further comprising:
receiving a selection to bypass an interpolator.

19. The storage system of claim 14, wherein, as a result of: shifting the signal phase of the signal based at least upon i) the corrected phase at the output of the phase loop and ii) the phase measured when the signal was digitally sampled by the analog-to-digital conversion circuit; adjusting the gain of the signal by the ratio of i) the current gain loop correction to ii) the gain correction made when the signal was digitally sampled by the analog-to-digital conversion circuit; and adjusting the signal based at least upon i) the output of the current offset correction and ii) the offset correction made when the signal was digitally sampled by the analog-to-digital conversion circuit, the correction circuit corrects the signal by utilizing information which was not applied when the signal was digitally sampled by the analog-to-digital conversion circuit.

20. The method of claim 17, wherein shifting a signal phase of the signal based at least upon i) a corrected phase at an output of a phase loop and ii) a phase measured when the signal was digitally sampled by the analog-to-digital conversion circuit further comprises:
shifting a signal phase of the signal by a difference of i) a corrected phase at an output of a phase loop and ii) a phase measured when the signal was digitally sampled by the analog-to-digital conversion circuit.

* * * * *